Jan. 22, 1957 J. M. BOOE 2,778,979
TANTALUM ELECTROLYTIC CAPACITORS WITH SOLID DEPOLARIZER
Filed April 29, 1955
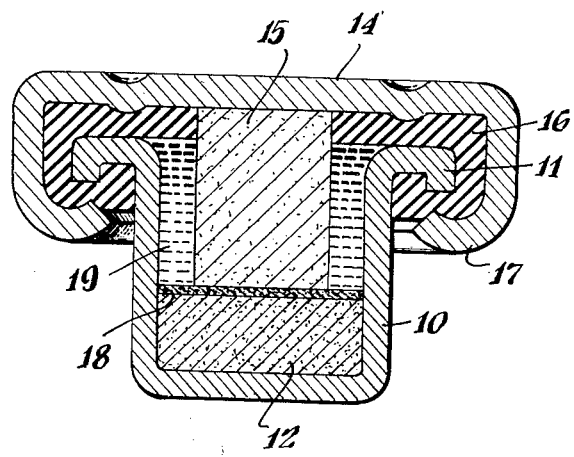
INVENTOR
James M. Booe
BY
ATTORNEY

United States Patent Office 2,778,979
Patented Jan. 22, 1957

2,778,979

TANTALUM ELECTROLYTIC CAPACITORS WITH SOLID DEPOLARIZER

James M. Booe, Indianapolis, Ind., assignor to P. R. Mallory & Co., Inc., Indianapolis, Ind., a corporation of Delaware Application April 29, 1955, Serial No. 504,739

16 Claims. (Cl. 317—230)

This invention relates to electrolytic capacitors, and, more particularly, to improved electrolytic capacitors comprising an anode of tantalum having a dielectric film formed thereon.

In my Patent No. 2,616,953, I have disclosed and claimed an electrolytic capacitor comprising an anode of tantalum, a cathode of silver, and an electrolyte of sulfuric acid. In my co-pending application Serial No. 311,993, filed September 29, 1952, now Patent No. 2,710,369, granted June 7, 1955, I have disclosed and claimed an electrolytic capacitor comprising an anode of tantalum, a cathode of copper, and an electrolyte of sulfuric acid. These capacitors were of the "plateable metal" type, operating on the principle of electrolytically dissolving silver or copper from the cathode when current was flowing through the capacitor in one direction and electrolytically depositing silver or copper on the said cathode from ions in the electrolyte when current was flowing through the capacitor in the opposite direction. This dissolution and deposition of ions of the cathode metal precluded the formation of gas films, corrosion films and asymmetric conducting films on the cathode and thereby prevented or minimized losses in the capacitor. Although depolarization by this principle was highly effective, it had certain limitations in capacitors of extremely small dimensions in which the anode and cathode were spaced very closely to each other and in capacitors which had to operate under rigorous conditions of high leakage current brought about by operating the capacitors at high voltage and high temperature.

It is an object of the present invention to improve tantalum electrolytic capacitors of the described general type.

It is another object of the invention to provide an electrolytic capacitor comprising an anode of tantalum, a cathode, an electrolyte, a suitable depolarizer dissolved in said electrolyte, and a solid body of said depolarizer in contact with said electrolyte.

It is a further object of the invention to provide a tantalum electrolytic capacitor having a large amount of depolarizer material present therein both in solid form, as well as dissolved in the electrolyte.

The invention also contemplates a tantalum electrolytic capacitor of novel and improved character which may be built in small dimensions with relatively high capacity values and which may be readily manufactured and sold on a practical and commercial scale at a low cost.

Other and further objects and advantages of the present invention will become apparent from the following description, taken in conjunction with the accompanying drawing, which is a vertical sectional view of a capacitor embodying the invention.

Broadly stated, in accordance with the principles of the invention, to improve electrolytic capacitors of the general type disclosed in my prior Patent No. 2,616,953 and in my copending application Serial No. 311,993, comprising a tantalum anode, a silver or copper cathode, and an electrolyte of sulfuric acid having a depolarizer of silver sulfate or of a sulfate of copper, respectively, dissolved therein, I provide a quantity of the depolarizer in contact with the electrolyte in excess of the amount that can be dissolved in the electrolyte. Thus, a substantial portion of the depolarizer remains in solid form and is available for replenishing the electrolyte with ions of the cathode metal whenever the concentration of such ions in the electrolyte decreases below the saturation point.

The use of solid silver or copper sulfate depolarizer is especially advantageous in electrolytic capacitors wherein the anode area is many times greater than the cathode area and the cell construction is of the tightly sealed type. Under these conditions, if no depolarizer were present, the normal electrolytic leakage current would cause hydrogen gas to be evolved on the cathode surface and this would produce a greater pressure within the cell than could be tolerated. The provision of a solid depolarizer, such as the sulfate of the cathode metal, not only stabilizes the capacitance and equivalent series resistance of the capacitor, but, in addition, it serves to prevent the liberation of hydrogen gas by the electrolytic leakage current, because, instead of liberating hydrogen, metallic silver or copper is deposited on the silver or copper cathode, respectively, in amounts equivalent to the electrolytic leakage current according to Faraday's Law.

Silver and copper sulfate are slightly soluble in the sulfuric acid electrolyte to respectively produce silver or copper ions in the solution. When these ions are liberated on the cathode in the metallic form, a corresponding amount of the solid cathode metal sulfate dissolves in the electrolyte to replenish the same with more cathode metal ions. Instead of silver sulfate, silver oxide, and instead of copper sulfate, copper oxide, may also be used as the depolarizing material. In use, the oxides react with the sulfuric acid to form a saturated solution of the sulfate of the cathode metal.

The solid cathode metal sulfate may be incorporated in the capacitor cell by merely adding it as powder or crystalline material to the electrolyte in sufficient quantity as to exceed its solubility in the electrolyte, thus leaving free depolarizer in solid form dispersed throughout the electrolyte. The amount added may even be great enough to produce a slurry with the electrolyte. In this case, there is sufficient excess of depolarizer present at all times to serve as a substantial reservoir, enabling the capacitor to operate for a longer period of time.

In another form of the invention, the depolarizer material, such as the sulfate or oxide of the cathode metal, may be pressed into the bottom of the capacitor cell or container constituting the cathode of the capacitor and may occupy virtually all of the space between the cathode and the anode, thus enabling the capacitor to operate over the longest periods of time. It has been found that the depolarizer should not be pressed into the cell or cathode container to an excessively high pressed density; otherwise the pressed body of depolarizer particles will not be sufficiently permeable to the electrolyte and for this reason reduction to the cathode metal will occur at the exposed or outer surface of the depolarizer pellet. Upon continued operation, this metal deposit may grow to the anode and produce a transient short circuit. It has been found that, to avoid this difficulty, the depolarizer material must not be pressed to a density greater than about 2.5 gms./cc. for silver and 2.25 gms./cc. for copper. Up to this pressed density sufficient permeation by the electrolyte is obtained so that the reduction to the cathode metal will occur at the extremity of the pressed depolarizer pellet next to the cathode container and farthest away from the anode.

As an added precaution, to prevent possible short circuits between the cathode container and the anode by the growth of cathode metal from the cathode, an ionically permeable porous barrier layer may be interposed between the anode and the cathode, preferably next to the anode. Barrier materials inert to the sulfuric acid electrolyte, such as microporous rubber, microporous vinyl films, asbestos paper, ceramic discs, and the like, have been found to be effective.

Referring now to the drawing, illustrating a preferred embodiment of the invention, reference numeral 10 denotes a casing of silver or copper constituting the cathode of the capacitor, said casing being closed at one end and having a flange 11 at its other end. A depolarizer in the form of solid silver or copper sulfate particles 12, respectively, is compressed in the bottom of the casing.

The anode structure of the capacitor comprises a top 14 of tantalum sheet, to the inner face of which there is secured in any suitable manner, such as by spot welding, tantalum pellet 15 constituted by a pressed and sintered body of tantalum powder and having a dielectric film formed thereon in the usual manner. The tantalum anode assembly is insulated from the cathode or casing by means of an interposed gasket 16 fabricated of a material suitable from the standpoint of corrosion resistance and high temperature characteristics, for example, a tetrafluoroethylene polymer. The circumferential marginal portions of top 14 are crimped down over gasket 16, as indicated at 17, constituting therewith a sealed enclosure for the capacitor.

An ionically permeable barrier layer 18 is interposed between anode pellet 15 and depolarizer 12 to prevent accidental short circuits. The remaining space within the casing is substantially completely filled out with sulfuric acid electrolyte 19, such electrolyte being substantially saturated with the sulfate of the cathode metal.

When during the operation of the capacitor, cathode metal is deposited on the cathode, a corresponding amount of sulfate of such metal is dissolved from the solid depolarizer body 12 and replenishes the electrolyte with ions of the cathode metal. Practical experience has indicated that the sealed tantalum capacitors of the invention, containing a substantial amount of excess solid cathode metal sulfate depolarizer over and above that required to produce a saturated solution, have a useful life several times as long as that of capacitors of the same general type but containing no solid depolarizer.

The present invention, including the use of a solid depolarizer, provides various advantages, the most important of which may be summarized as follows:

1. It permits obtaining full or maximum capacitor efficiency by enabling the anode to exhibit its maximum capacitance and by reducing electrical losses in the cell in that the resistance at the cathode-electrolyte junction is reduced to a minimum.

2. It permits extreme miniaturization in that the area of the cathode need only be an extremely small fraction of that of the anode and the anode necessary to obtain a certain capacitance may be made considerably smaller than was possible in prior tantalum electrolytic capacitors.

3. It increases useful life because the depolarizer precludes the liberation of hydrogen gas at the cathode by the D. C. leakage current during operation, thus minimizing gas pressure within the cell.

4. It improves operation over a broad temperature range, such as from −65° C. to 200° C.

It appears that in most cases the copper-copper sulfate system may have certain advantages over the silver-silver sulfate system. Obviously, the cost of copper and copper sulfate is considerably lower than that of silver and silver sulfate. The use of copper permits higher concentrations of ions of the cathode metal in the electrolyte and produces a more uniform deposit of such metal on the cathode than is obtainable with the silver-silver sulfate system. If copper sulfate is compared with silver sulfate on the basis of electro-chemical equivalence, then the copper would be twice as effective as silver from the standpoint of life because it must undergo a valence reduction of two instead of a valence reduction of one for silver. This means that essentially the copper would depolarize about twice as much current as would the silver.

In capacitors embodying the invention the concentration range for the sulfuric acid electrolyte may be between 5% and 75%, the preferred range being between 35% and 45%.

When employing copper sulfate as the solid depolarizer, either its anhydrous form ($CuSO_4$) or its hydrated form ($CuSO_4.5H_2O$) may be used. There is, however, some advantage in the use of the hydrated form in that, as copper is plated from the solution, the increasing concentration of sulfuric acid is offset by the liberation of water from the salt. This, of course, is not the case when the anhydrous copper sulfate is used. It is also possible to use cuprous sulfate ($Cu_2SO_4$) as the solid depolarizer, although it is not as satisfactory as cupric sulfate due to its relatively low solubility and unstable nature.

In order to obtain a smooth deposit of the copper on the cathode, it is desirable to add certain grain refining agents to the electrolyte. Examples of such additions and their preferred concentrations are as follows:

Glue, about 25 parts per million.
Goulac, a resinous by-product of paper refining about 0.1%.
Molasses, about 0.1%.
Dextrose, about 0.1%.
Phenol sulfonic acid, about 0.1%.
Thiourea, about 0.001%.

Although the present invention has been disclosed in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. An electrolytic capacitor comprising, in combination, a tantalum anode having a dielectric film thereon, a cathode of a metal selected from the group consisting of copper and silver, an electrolyte of sulfuric acid having a concentration between 5% and 75% and being substantially saturated with ions of the cathode metal in contact with said anode and cathode, and a compound of the cathode metal in solid form in contact with said electrolyte, said compound being soluble in the electrolyte and being adapted to maintain the concentration of ions of the cathode metal therein at saturation during the operative life of the capacitor.

2. An electrolytic capacitor comprising, in combination, a film forming anode of tantalum, a cathode of a metal selected from the group consisting of copper and silver, an electrolyte of sulfuric acid substantially saturated with ions of the cathode metal interposed between and in contact with said anode and cathode, and a solid depolarizer of an oxide of the cathode metal in contact with said electrolyte adapted to maintain the concentration of ions of the cathode metal therein at saturation during the operative life of the capacitor.

3. An electrolytic capacitor comprising, in combination, a film forming porous anode of tantalum, a cathode of silver, an electrolyte of sulfuric acid substantially saturated with silver sulfate interposed between said anode and cathode, and solid silver sulfate in contact with said electrolyte in an amount sufficient to maintain the electrolyte in the saturated condition during the operative life of the capacitor.

4. An electrolytic capacitor comprising, in combination, a film forming porous anode of tantalum, a cathode of copper, an electrolyte of sulfuric acid substantially saturated with copper sulfate interposed between said anode and cathode, and solid copper sulfate in contact with said electrolyte in an amount sufficient to maintain the electrolyte in the saturated condition during the operative life of the capacitor.

5. An electrolytic capacitor as claimed in claim 4, wherein the solid depolarizer is hydrated copper sulfate.

6. An electrolytic capacitor comprising, in combination, an anode of tantalum having a dielectric film formed thereon, a cathode of a metal selected from the group consisting of copper and silver, an electrolyte of sulfuric acid substantially saturated with the sulfate of the cathode metal interposed between said anode and cathode, and a substantial quantity of solid particles composed of the sulfate of the cathode metal suspended in said electrolyte in an amount sufficient to maintain therein the concentration of ions of said metal at saturation during the operative life of the capacitor.

7. An electrolytic capacitor comprising, in combination, a casing having an inner surface of a metal selected from the group consisting of copper and silver constituting the cathode of the capacitor, an anode of tantalum in said casing and spaced therefrom, an electrolyte of sulfuric acid substantially saturated with the sulfate of the cathode metal interposed between said cathode and anode, and a porous body of a solid compound of the cathode metal soluble in said electrolyte in contact with the cathode and said electrolyte but spaced from said anode adapted to maintain the concentration of ions of the cathode metal in the electrolyte at saturation during the operative life of the capacitor.

8. An electrolytic capacitor comprising, in combination, a casing of silver constituting the cathode of the capacitor, a body of a solid silver compound selected from the group consisting of silver oxide and silver sulfate compressed in the bottom of said casing, an anode of tantalum having a dielectric film formed thereon in said casing and spaced therefrom and from said body of silver compound, and an electrolyte of sulfuric acid substantially saturated with silver ions filling out the casing, said solid silver compound being present in an amount sufficient to maintain the electrolyte in the saturated condition during the operative life of the capacitor.

9. An electrolytic capacitor as claimed in claim 8, wherein the density of the compressed body of silver compound does not exceed about 2.5 gms./cc.

10. An electrolytic capacitor comprising, in combination, a casing of copper constituting the cathode of the capacitor, a body of a solid copper compound selected from the group consisting of copper oxide and copper sulfate compressed in the bottom of said casing, an anode of tantalum having a dielectric film formed thereon in said casing and spaced therefrom and from said body of copper compound, and an electrolyte of sulfuric acid substantially saturated with copper ions filling out the casing, said solid copper compound being present in an amount sufficient to maintain the electrolyte in the saturated condition during the operative life of the capacitor.

11. An electrolytic capacitor as claimed in claim 10, wherein the density of the compressed body of copper compound does not exceed about 2.25 gms./cc.

12. An electrolytic capacitor comprising, in combination, a casing of a metal selected from the group consisting of copper and silver constituting the cathode of the capacitor, a solid depolarizer body composed of the sulfate of the cathode metal compressed in the bottom of said casing, a porous anode of tantalum having a dielectric film formed thereon in said casing and spaced therefrom and from said body of sulfate, an electrolyte of sulfuric acid substantially saturated with ions of the cathode metal filling out said casing, and an ionically permeable barrier layer interposed between said anode and said depolarizer body, said solid sulfate of the cathode metal being present in an amount sufficient to maintain the electrolyte in the saturated condition during the operative life of the capacitor.

13. An electrolytic capacitor comprising, in combination, a casing of a metal selected from the group consisting of copper and silver constituting the cathode of the capacitor, a porous solid depolarizer body of the sulfate of the cathode metal compressed in the bottom of said casing, a porous anode of tantalum having a dielectric film formed thereon in said casing, a metal top cover and terminal plate to which said anode is secured, an insulative gasket compressed between cooperating marginal portions of said casing and said top cover plate and constituting therewith a sealed enclosure for the capacitor, and an electrolyte of sulfuric acid substantially saturated with ions of the cathode metal filling out said enclosure, said solid sulfate of the cathode metal being present in an amount sufficient to maintain the electrolyte in the saturated condition during the operative life of the capacitor.

14. An electrolytic capacitor comprising, in combination, a casing of a metal selected from the group consisting of copper and silver constituting the cathode of the capacitor, a solid depolarizer body composed of the sulfate of the cathode metal compressed in the bottom of said casing, an anode in the form of a porous body of pressed and sintered tantalum powder in said casing and having a dielectric film formed thereon, a metal top cover plate to which said anode is secured, an insulative gasket compressed between cooperating marginal portions of said casing and said top cover plate and constituting therewith a sealed enclosure for the capacitor, and electrolyte of sulfuric acid substantially saturated with ions of the cathode metal filling out said enclosure, and an ionically permeable barrier layer interposed between said anode and said depolarizer body, said solid sulfate of the cathode metal being present in an amount sufficient to maintain the electrolyte in the saturated condition during the operative life of the capacitor.

15. An electrolytic capacitor comprising, in combination, an anode of porous tantalum having a dielectric film formed thereon, a cathode of a metal selected from the group consisting of copper and silver, an electrolyte of sulfuric acid substantially saturated with the sulfate of the cathode metal interposed between and in contact with said anode and cathode, and a solid body of said sulfate in contact with said electrolyte in an amount sufficient to maintain the electrolyte in the saturated condition during the operative life of the capacitor, said cathode being capable of responding to the flow of current through the capacitor in one direction by the dissolution of cathode metal in the electrolyte and of responding to the flow of current through the capacitor in the opposite direction by the deposition of cathode metal from the electrolyte.

16. An electrolytic capacitor comprising, in combination, a film forming anode of tantalum, a cathode of copper, an electrolyte of sulfuric acid substantially saturated with copper ions interposed between and in contact with said anode and cathode, a solid depolarizer of a sulfate of copper in contact with said electrolyte adapted to maintain an adequate concentration of copper ions therein, and a small quantity of a grain refining agent dissolved in said electrolyte, said solid sulfate of copper being present in an amount sufficient to maintain the electrolyte in the saturated condition during the operative life of the capacitor.

References Cited in the file of this patent
UNITED STATES PATENTS

| | | |
|---|---|---|
| 2,616,953 | Booe | Nov. 4, 1952 |
| 2,710,369 | Booe | June 7, 1955 |